P. BARDUCCI.
DRYING CHAMBER.
APPLICATION FILED FEB. 24, 1916.

1,282,363.

Patented Oct. 22, 1918.
2 SHEETS—SHEET 1.

Pilade Barducci
Inventor by Laurence Langner
Attorney

P. BARDUCCI.
DRYING CHAMBER.
APPLICATION FILED FEB. 24, 1916.
1,282,363.
Patented Oct. 22, 1918.
2 SHEETS—SHEET 2.
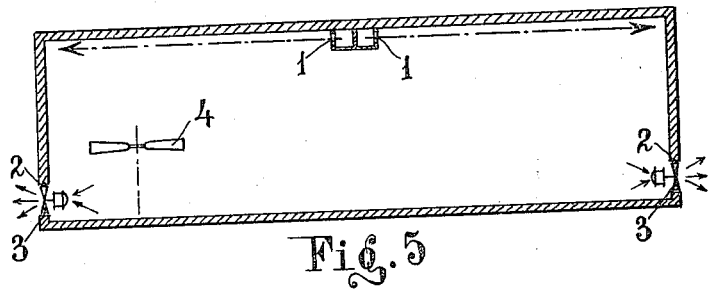
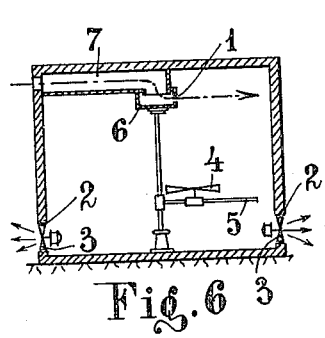 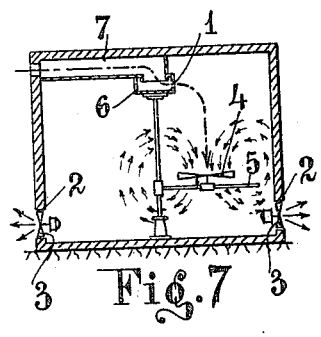
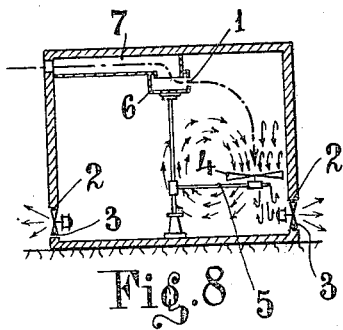
Pilade Barducci
Inventor,
by Lawrence Langner
Attorney.

UNITED STATES PATENT OFFICE.

PILADE BARDUCCI, OF NAPLES, ITALY.

DRYING-CHAMBER.

1,282,363.  Specification of Letters Patent.  Patented Oct. 22, 1918.

Application filed February 24, 1916. Serial No. 80,202.

*To all whom it may concern:*

Be it known that I, PILADE BARDUCCI, a subject of the King of Italy, residing at Naples, Italy, have invented certain new and useful Improvements in Drying-Chambers, of which the following is a specification.

This invention relates to drying chambers, particularly chambers for drying alimentary pastes, in which the air is agitated by one or more fans having vertical axes which travel in the chamber.

Owing to the described mounting of the fans, each of them produces two vertical air streams, that is by way of example a direct upward stream and a return downward stream, said streams traveling in the chamber so that in any given portion of the same there is first produced an air stream having one direction and then another air stream having opposite direction, said air streams having increasing intensities when the fan is approaching to said portion of the chamber and decreasing when the fan is moving off from the same.

In order to obtain a satisfactory operation of said traveling fan or fans, the fresh air which is introduced in the chamber and which may be heated if required, must be fed at any time in the portion of the chamber occupied by the fan or fans, so as to have said fresh air mixed with the ambient air.

According to this invention said result is obtained by arranging the orifices intended to feed the fresh air into the chamber as well as the exhausters discharging the air from the same, in the walls of the chamber near its opposite ends, said orifices and exhausters being not directly opposite to each other, but arranged at different levels comprising between them the articles to be dried; further said orifices have such an area with respect to the speed of the air fed in the chamber, as to produce an air stream which is parallel with the path of the fan or fans.

The annexed drawings show by way of example some constructions of the arrangement according to this invention; in said drawings:—

Fig. 5 is a modified construction the feeding orifice being arranged in the intermediate portion of the chamber;

Fig. 6 shows the arrangement of the parts in the case of a fan reciprocating on an arm which is mounted to rotate on a central rod;

Fig. 7 shows the same in operation;

Fig. 8 shows the same parts in another position.

Figure 1:
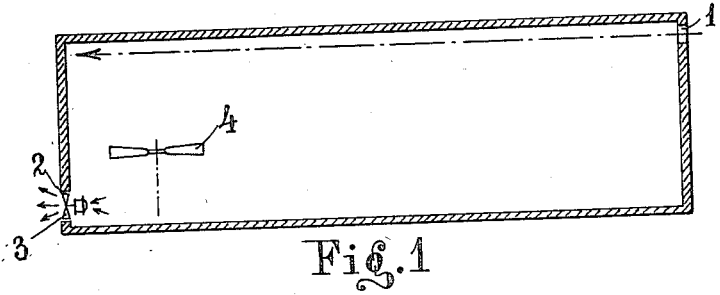
Figure 1 is the longitudinal section of a chamber showing an arrangement of the parts in the case of a single traveling fan.
Figure 2:
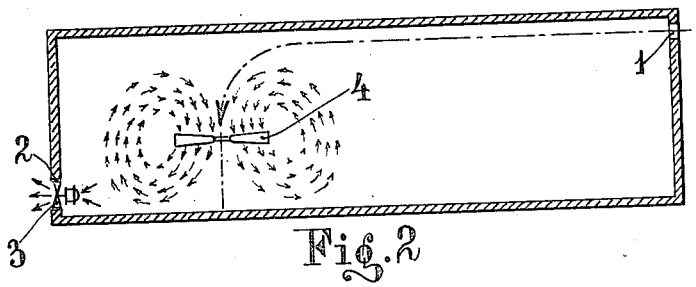
Fig. 2 is the same section the traveling fan being in operation.
Figure 3:
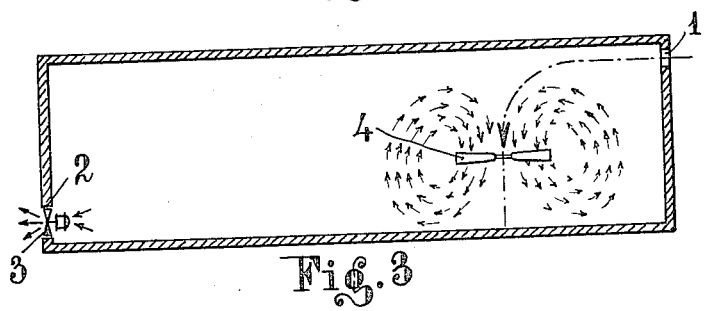
Fig. 3 is the same section the traveling fan being in another position.

In the case of the construction shown in Figs. 1–3, the orifice 1 intended to feed the fresh air is provided in one of the end walls of the chamber, near the ceiling of the same, and the exhausting orifice 2 is provided in the opposite end wall, near the floor, an exhauster 3 being mounted in front of this latter orifice.

To calculate the area of the feeding orifice 1, a value approximately equal to the length of the chamber and measured in proper units must be assumed for the velocity of the air stream passing through the chamber under the action of the exhauster 3, *i. e* in the formula; the area of the orifice multiplied by the velocity of the air stream will equal the output of the exhauster per unit of time. In this manner a sufficiently strong air stream is obtained which cannot be deviated by the air currents which arise in the chamber because of differences in temperature, and this stream is thus maintained horizontal and adjacent to either the ceiling or the floor of the chamber as the case may be, as shown by way of example on the drawings by dotted lines. The traveling fan 4 having such a power as to deviate said air stream, the same air feeds directly the fan, and is thereby mixed with the ambient air (Figs. 2, 3 and 4).

Obviously as the fan 4 travels in a path parallel to the air stream thus produced, the air stream is at any time deviated by the fan at the point occupied by this latter, and the length of said stream is accordingly modified during the stroke of the fan, the feeding of the air to the same being thus maintained (Figs. 2 and 3).

Figure 4:
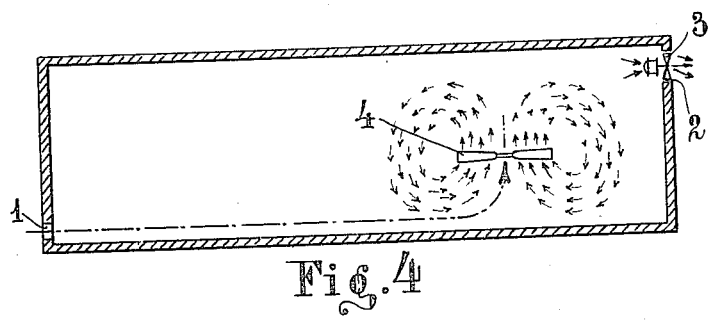
Fig. 4 is the longitudinal section of a chamber in which the feeding orifice is arranged near the floor while the exhauster is arranged near the ceiling.

The operation is the same when the feeding orifice is arranged near the floor, the exhauster 3 being arranged near the ceiling of the casing as shown in Fig. 4; in this case the fan 4 must operate so as to produce a downward air stream.

The feeding orifices may be arranged in the intermediate portion of the chamber and open in opposite directions as shown in Fig. 5, the exhauster orifices being provided at the two ends of the chamber and at different levels with regard to the feeding orifices.

Two horizontal air streams are thus obtained, the same feeding in succession the traveling fan along the corresponding portion of its stroke from end to end of the chamber.

When the chamber is square and the fan 4 is mounted to reciprocate on an arm 5 rotating around a stationary vertical rod arranged at the center of the chamber, the feeding orifice 1 may be provided in a box 6 connected with a stationary duct 7 and rotating with the arm 5; the air stream is horizontal when the fan is at rest as shown by Fig. 6, and the same feeds continuously the fan when the same is in operation (Figs. 7 and 8) said air being exhausted through orifices 2 arranged at different levels than fan 4 and orifice 1.

In any case according to this invention the advantage is obtained that the traveling fan or fans produce an efficient mixing of the ambient air with the fresh air (which may be heated if required), said mixing being uniformly effected during the travel of the fan and at any point of the same.

What I claim as my invention and desire to secure by United States Letters Patent is:—

1. In a drying chamber in which ventilation is effected by a fan traveling therein and rotating on a vertical axis, walls having inlet and outlet ports located at points apart from each other and at different levels and means for feeding fresh air into the chamber, said means generating in the chamber for each inlet port, an air stream initially directed parallel to the plane along which the fan travels.

2. In a drying chamber in which ventilation is effected by a fan traveling therein and rotating on a vertical axis, walls having inlet and outlet ports located at points apart from each other and at different levels and comprising between them the portion of the chamber in which the fan travels and in which is arranged the material to be dried, and means for inducing in the chamber through each inlet port an air stream initially directed parallel to the plane along which the fan travels.

3. In a drying chamber in which ventilation is effected by a vertical axis fan traveling in the chamber, inlet and outlet ports located at different levels in opposite walls of the chamber and comprising between them the portion of the chamber in which the fan travels and in which is arranged the material to be dried, and means for inducing in the chamber through each inlet port an air stream initially directed parallel to the plane along which the fan travels.

4. In a drying chamber in which ventilation is effected by a vertical axis fan traveling therein, inlet ports formed adjacent the ceiling of the chamber and outlet ports formed in opposite walls thereof, said inlet and outlet ports being located at different levels and comprising between them the portion of the chamber in which the fan travels and in which is arranged the material to be dried, and means for inducing in the chamber through each inlet port an air stream initially directed parallel to the plane along which the fan travels.

5. In a drying chamber in which ventilation is effected by a vertical axis fan traveling therein, an inlet port formed adjacent the ceiling of the chamber and outlet ports formed in opposite walls thereof, said inlet and outlet ports being located at different levels and comprising between them the portion of the chamber in which the fan travels and in which is arranged the material to be dried and means for inducing in the chamber through the inlet port an air stream initially directed parallel to the plane along which the fan travels.

6. In a drying chamber in which ventilation is effected by a fan traveling therein and rotating on a vertical axis, walls having inlet and outlet ports located at points apart from each other and at different levels, and exhausting means at every outlet port for generating in the chamber for each inlet port, an air stream initially directed parallel to the plane along which the fan travels, said air stream being stronger than the air current arising in the chamber through differences in density and weaker than the suction created by the fan.

In testimony whereof I affix my signature in presence of two witnesses.

PILADE BARDUCCI.

Witnesses:
 NICOLO GUSUNG,
 EDW. H. COPP.